Sept. 21, 1965        R. F. ANDERSON        3,207,367
HYDRAULIC MEASURING APPARATUS AND CONTROL SYSTEM
Filed June 17, 1963        2 Sheets-Sheet 2
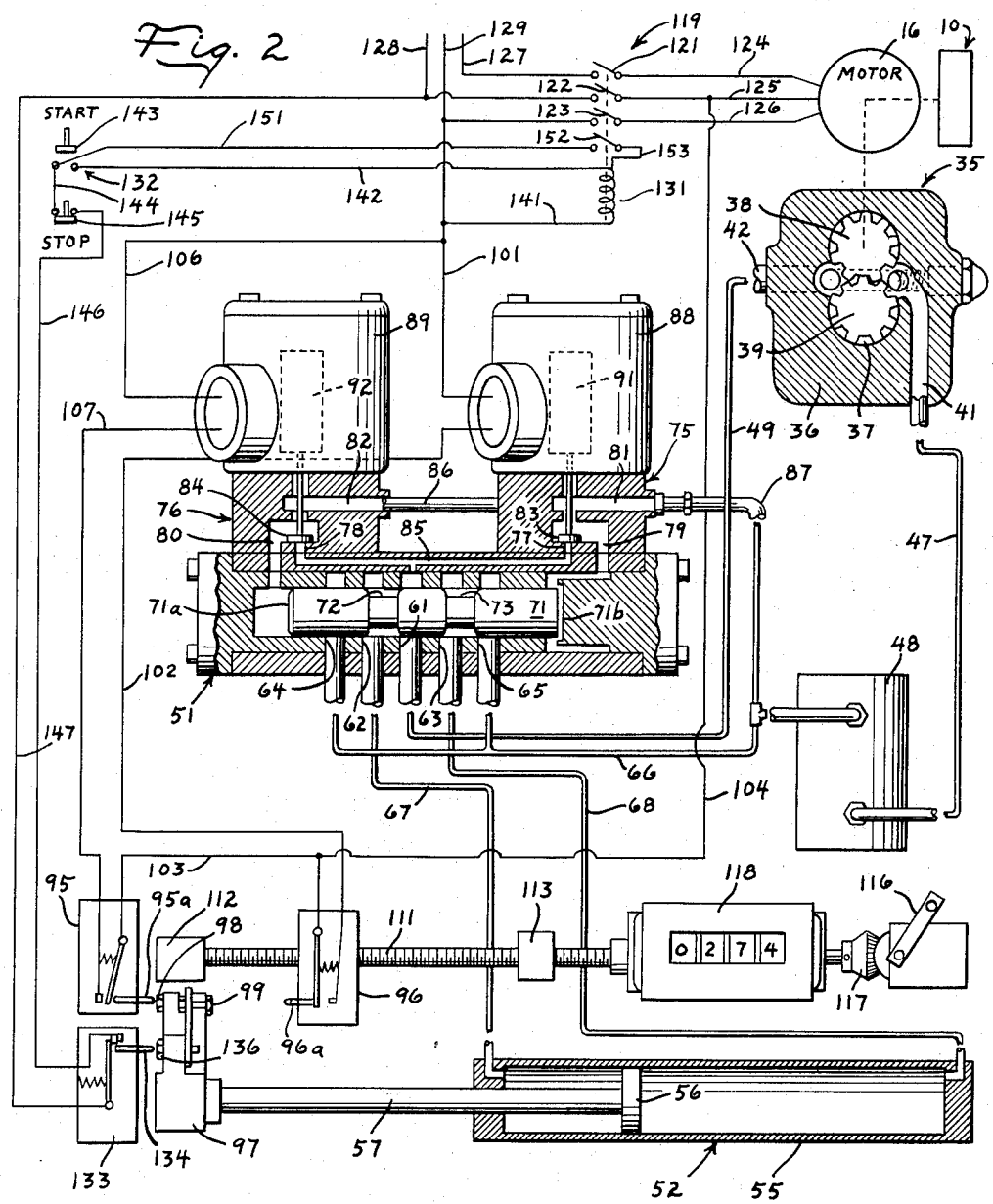
Inventor
Ralph F. Anderson
By McCanna, Morsbach & Pillote
Atty's

United States Patent Office 3,207,367
Patented Sept. 21, 1965

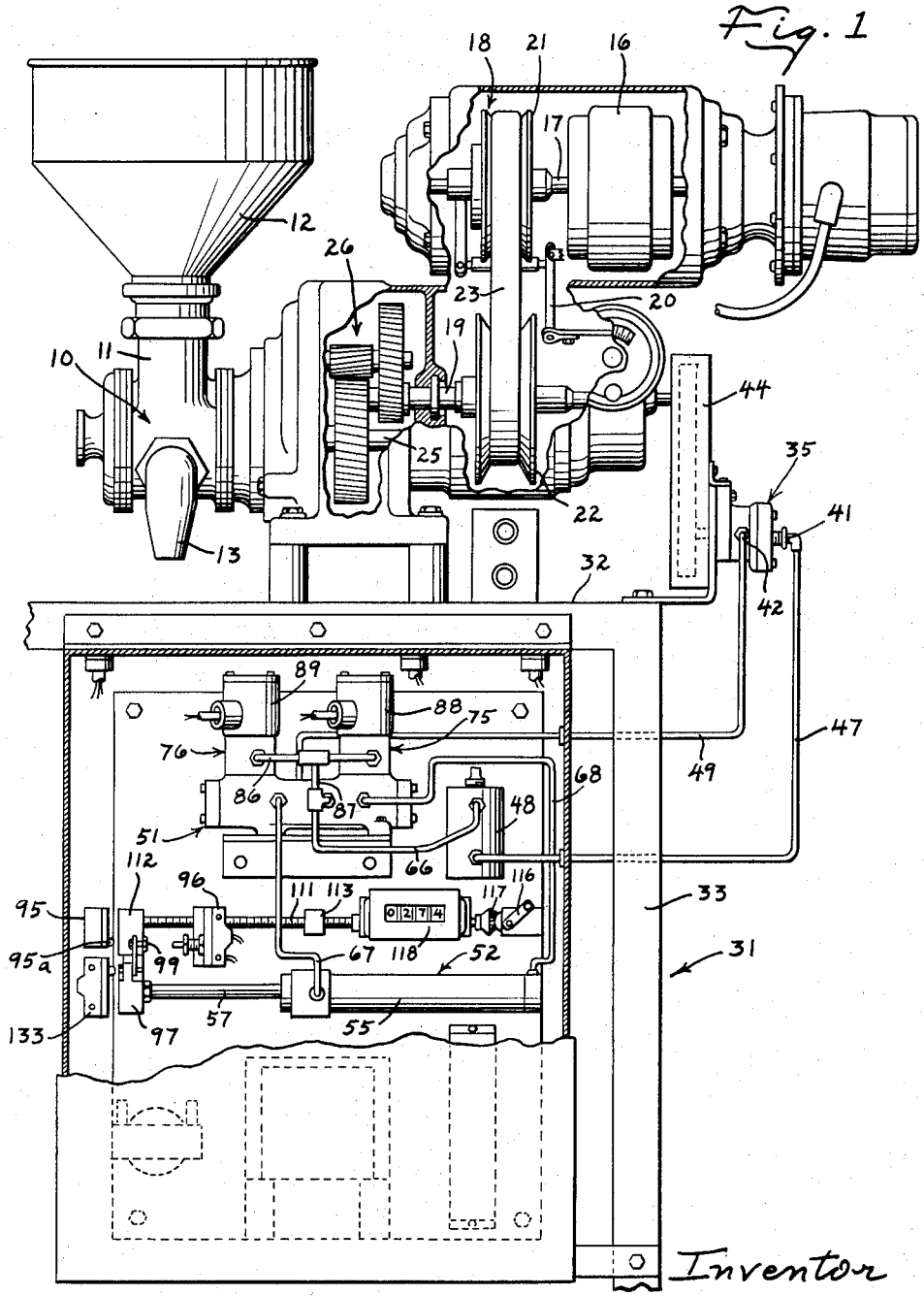

3,207,367
HYDRAULIC MEASURING APPARATUS AND CONTROL SYSTEM
Ralph F. Anderson, 332 Calvin Park Blvd., Rockford, Ill.
Filed June 17, 1963, Ser. No. 288,416
15 Claims. (Cl. 222—18)

This invention relates to a control system having an hydraulically operated apparatus for measuring the revolutions of a rotary device.

An important object of this invention is to provide a control system having an hydraulically operated apparatus for measuring the revolutions of a rotary device and which is adapted for operation at high speeds.

Another object of this invention is to provide a control system having an hydraulically operated apparatus for measuring the number of revolutions of a rotary device and which is readily adjustable to measure any preselected number of revolutions of the rotary device.

A further object of this invention is to provide a control system for a rotary device of the type having a cyclically operated mechanism associated therewith, which control system includes an hydraulically operated apparatus for measuring a preselected number of revolutions of the rotary device and for automatically operating the cyclically operated mechanism when the device is rotated through the preselected number of revolutions.

Yet another object of this invention is to provide a control system including an hydraulically operated apparatus for measuring the revolutions of a rotary device which is of simple construction and which is reliable in operation.

The control system including the hydraulically operated measuring apparatus of the present invention is characterized by the provision of a metering pump operatively connected to a rotary device to be driven thereby and a measuring cylinder connected to the metering pump and a control mechanism operated by the measuring cylinder.

These, together with other objects and features of this invention will be more readily appreciated as the same becomes better understood by reference to the following detailed description when taken in connection with the accompanying drawings wherein:

FIG. 1 is a front elevational view of a rotary device embodying the measuring apparatus and control system of the present invention; and FIG. 2 is a diagrammatic view illustrating the hydraulically operated measuring apparatus and control system.

The control system and hydraulic measuring apparatus of the present invention is generally adapted for use with a rotary device to measure or count the number of revolutions of the device. The hydraulically operated measuring apparatus is preferably embodied in a control system which produces a control signal after the rotary device is rotated through a preselected number of revolutions, which control signal can be used to actuate a device for signalling an operator or to automatically operate some mechanism associated with the rotary device. The particular signalling device or mechanism to be actuated by the control system will vary for different types of rotary devices. The control system and hydraulically operated measuring apparatus specifically illustrated and described herein is adapted for use with a rotary pumping device and is arranged to operate a mechanism associated with the rotary device for interrupting operation of the product pump after a preselected number of revolutions of the pump to thereby regulate the amount of material being pumped.

As shown in FIG. 1, the rotary apparatus includes, a main pump 10 hereinafter sometimes referred to as a product pump, of the positive displacement type, and which may comprise a conventional vane pump, gear pump or the like. The product pump 10 has an inlet 11 connected to a hopper or other supply source 12, and an outlet 13. The positive displacement pump 10 is adapted to deliver fluid to the outlet 13 in a quantity proportional to the number of revolutions of the pump. The pump drive, as shown in FIG. 1, includes a drive motor 16 having a shaft 17 connected through a conventional variable speed drive 18 to a shaft 19. While any suitable form of variable speed drive can be used, the drive herein shown includes adjustable V-pulleys 21 and 22 connected by a belt 23. This variable speed drive is of a well known construction, and further detailed description of the structure is deemed unnecessary. In general, the V-pulleys have laterally adjustable sections which change the effective diameter of the pulleys and a means including a linkage 20 for differentially adjusting the pulleys. The output shaft 19 of the variable speed drive is connected to the pump shaft 25 through gearing 26 to drive the pump at a suitable speed.

The product pumping apparatus and drive therefor is conveniently mounted on a support base 31, and which base includes a top 32 and upstanding support legs 33. The control system including an hydraulically operated measuring apparatus is mounted on the base and is arranged to measure the number of revolutions of the rotary apparatus and to control operation of the rotary device after a preselected number of revolutions.

The hydraulically operated measuring apparatus includes a metering pump 35 of the positive displacement type, and, as shown in FIG. 2, comprises a casing 36 having intersecting pump bores 37 and intermeshing gears 38 and 39 disposed in the pump bores for pumping fluid from the pump inlet 41 to the pump outlet 42. The metering pump 35 is drivingly connected to the pump drive shaft 25 to be driven proportionately thereto, and, as shown, is connected to a positive type drive such as a gear or sprocket chain drive designated 44 to the output shaft 19 of the variable speed drive. Since the shaft 19 is also connected to the pump drive shaft 25 through gearing 26, it will be seen that the metering pump 35 is driven at the speed proportional to the speed of the main pump 10.

The metering pump 35 has its inlet 41 connected through a supply line 47 to a liquid reservoir 48. The metering pump outlet 42 is connected through a delivery line or conduit 49 and flow reversing valve 51 to a measuring cylinder 52. The measuring cylinder 52 measures the output of the metering pump and operates a control device after a preselected amount of hydraulic fluid has been delivered by the metering pump corresponding to a preselected number of revolutions of the drive shaft 25 for the rotary device. As shown, the measuring cylinder 52 includes a cylinder 55 having a piston 56 movable therein and a rod 57 extending out of the cylinder. The flow reversing valve 51 may be of any conventional construction and includes a valve body having an inlet port 61 which is connected to the metering pump delivery line 49, and first and second control ports 62 and 63. The valve body also includes return ports 64 and 65 which are connected as through a conduit 66 with the reservoir 48 to return the liquid to the reservoir. The control ports 62 and 63 are connected to the measuring cylinder 55 at relatively opposite sides of the piston 56 therein through conduits 67 and 68. A valve member 71, herein shown in the form of a spool having spaced grooves 72 and 73, is mounted in the valve body for controlling flow between the ports. The valve member 71 is movable from the position shown in FIG. 2, in which it passes fluid from the inlet port 61 to the control port 62 and communicates the control port 63 with the return port 65, to a second position in which it communicates the inlet port 61 with the control port 63 and communicates the control port 62 with the return port 64. Any suitable means may be provided for moving the valve member 71 from the position shown in FIG. 2 to its other position and, as shown, the ends of the valve member are arranged to form piston faces designated 71a and 71b. Fluid is supplied and exhausted from the piston faces 71a and 71b under the control of valves 75 and 76. The valves 75 and 76 are similarly constructed and are conveniently in the form of conventional three-way valves. As diagrammatically shown in FIG. 2, the valves 75 and 76 respectively include inlet or pressure ports 77, 78, valve ports 79, 80 and exhaust ports 81, 82. The valves 75 and 76 also include valve members 83, 84, respectively, which are movable from a position closing the respective pressure ports 77, 78 to a position closing the respective exhaust ports 81, 82. The pressure ports 77, 78 are conveniently connected to the inlet port 61 of the flow reversing valve through passages 85 in the flow reversing valve to receive fluid under pressure therefrom, and the exhaust ports 81, 82 are connected through conduits 86, 87 to the reservoir to return the fluid thereto. The valves 75, 76 may be operated from any suitable actuator and, as shown, are operated by electro-responsive operators including solenoids 88, 89 having plungers 91, 92.

The metering pump 35 delivers fluid through the flow reversing valve to the measuring cylinder and moves the piston 56 and rod 57 through a distance corresponding to the number of revolutions of the rotary apparatus. Provision is made for automatically operating the flow reversing valve at each end of the stroke on the piston 56, and for adjusting the stroke of the piston 56 to thereby vary the number of revolutions of the rotary apparatus to move the piston from one end of its stroke to the other. For this purpose, first and second switches designated 95 and 96 are provided and arranged to be operated by the piston rod 57. As shown in FIG. 2, the switches 95 and 96 are each of the normally open type and include a switch actuator 95a, 96a. A head 97 is provided on the piston rod 57 and has first and second adjustable switch actuators 98 and 99 respectively arranged to engage the actuators 95a and 96a at relatively opposite ends of the stroke of the piston. As shown in FIG. 2, the switch 96 is connected in a series circuit including conductor 101, solenoid coil 88, conductor 102, switch 96 and conductors 103 and 104. The switch 95 is similarly connected in series circuit including conductors 106, solenoid coil 89, conductor 107, switch 96 and conductors 104. Thus, the switch 95 is arranged to operate the solenoid 89 when the piston reaches the left end of its stroke to reverse the main flow reversing valve 51, and the switch 96 is arranged to operate the solenoid 88 when the piston reaches the right hand end of its stroke, to again reverse the main valve 51. Provision is also made for varying the number of revolutions of the rotary apparatus required to move the piston from one end of its stroke to the other, to adapt the measuring apparatus to count different numbers of revolutions, and this is conveniently achieved by adjusting the switches 95 and 96 relative to each other in a direction longitudinally of the path of movement of the piston rod, to thereby vary the stroke of the piston. As shown, the switch 96 is supported on a threaded rod 111 which is rotatably supported in bearings 112 and 113 to extend generally parallel to the piston rod 57. The switch 96 is movable parallel to the rod 57. The switch 96 is movable parallel to the rod 57 toward and away from the switch 95 in response to turning of the threaded rod 111. The rod 111 is conveniently turned through a crank 116 and bevelled gearing 117 and an indicator means, herein shown in the form of a counter 118 connected to the threaded rod 111, is provided for indicating the relative length of the stroke of the piston rod. The counter 118 can conveniently be calibrated in terms of the number of revolutions of the pump drive shaft required to move the piston rod through its stroke. This adjustment of the effective stroke of the measuring piston enables the hydraulically operated measuring apparatus to be adjusted over a wide range. If it is desired to further extend the range of the measuring apparatus, it is only necessary to change the speed ratio between the main shaft 25 and the metering pump 35.

The hydrauliclly operated measuring apparatus is connected in a control system which is arranged to automatically control a mechanism associated with the rotary device after the latter has been rotated through the preselected number of revolutions. The particular mechanism associated with the rotary device which is to be controlled by the measuring apparatus will vary with different rotary devices. In the rotary pump device illustrated, a mechanism designated generally by the numeral 119 is provided for controlling the drive to the main pump 10 to start and stop the pump. This mechanism 119 is conveniently in the form of a relay having switches 121–123 for controlling energization of the drive motor 16. The motor 16 for driving the rotary device is connected through conductors 124–126 and relay operated switches 121–123 to the power supply conductors 127–129. The relay 119 also includes an operating coil 131 which is arranged to control opening and closing of relay operated switches 121–123. In the control system herein shown, a selectively operable means 132 is provided for initiating an operating cycle of the rotary device and the measuring apparatus is arranged to operate a control means 133 to automatically interrupt operation of the rotary device after the latter has been turned through a selected number of revolutions. The control means is conveniently in the form of a control switch having an actuator 134 which is arranged to be actuated by the piston rod 57 of the timer. As is apparent, either one stroke or a full reciprocation of the piston in the measuring cylinder may be used to measure or count the number of revolutions of the rotary device. In the form illustrated, a full reciprocation including a forward and return stroke of the piston is employed and the control switch 134 is positioned so as to be operated by an adjustable switch actuating finger 136 on the head 97, when the piston is retracted toward the position shown in FIG. 2. Alternatively, dual control switches could be provided one at each end of the stroke of the piston, to effect control of the rotary device at each end of the stroke of the piston. If a single stroke of the piston is employed, it is preferable to extend the rod 97 completely through the cylinder so as to equalize the volume of liquid displaced at each side of the piston 56.

A control circuit connects the cycle initiating means 132 and the control switch 133 to the relay coil 131. The control circuit shown includes a conductor 141 which connects one side of the relay coil to conductor 129 of the power supply. The other side of the relay coil is connected through a conductor 142 to the cycle initiating means 132, herein shown in the form of a normally open, manually operable start switch 143. The start switch is connected in a series circuit through conductor 144, normally closed, manually operable stop switch 145, and conductor 146 to the control switch 133, and the control switch is otherwise connected through conductor 147 to the conductor 128 of the power supply. A relay coil holding circuit is provided and includes a conductor 151 connected to the conductor 144, a holding switch 152 operated by the relay coil 131 and a conductor 153 which connects the holding switch to the relay coil 131.

From the foregoing it is thought that the operation and construction of the control system having the hydraulically operated measuring apparatus will be understood. The various parts including the switches, valves and measuring piston are shown in FIG. 2 in their normal or rest position. A cycle of operation is initiated by closing the start switch 143. This completes a circuit from power conductor 128 through conductor 147, normally closed control switch 133, conductor 146, normally closed stop switch 145, start switch 143, relay coil 131 and conductor 141 to the other power supply conductor 129. The relay coil when energized closes the relay switches 121-123 and also closes the holding switch 152 to maintain a circuit to the coil 131. Closing of the switches 121-123 starts the drive motor 16 which then rotates the rotary apparatus 10 through the variable speed drive 21 and gearing 26. The metering pump 35 is also driven at this time at a rate proportional to the speed of the main pump 10 and delivers fluid through the delivery line 49 to the inlet port 61 of the reversing valve. The valve member 71 is in the position shown in FIG. 2 and fluid is directed from the inlet port through the control port 62 and conduit 67 to the measuring cylinder at one side of the piston 56. This forces the piston 56 from its normal position toward an extended position and, as the piston moves toward its extended position, it allows the normally open switch 95 to open. After the measuring pump has displaced a volume of liquid corresponding to a preselected number of revolutions of the main pump 10, the actuating finger 99 on the head 97 engages the actuator 96a of the switch 96 to close the same. Closing of the switch 96 completes a circuit to the solenoid 88 to thereby move the valve 75 to its raised position blocking flow to the exhaust port 81 and communicating the supply port 77 with the valve port 79. Fluid under pressure is then supplied the piston face 71b at the right hand end of the flow reversing valve to move the latter to a reverse flow position. The metering pump continues to deliver fluid through the delivery line 49 and the reversing valve now directs the fluid from the inlet port 61 to the control port 63 and through conduit 68 to the other end of the measuring cylinder. The piston 56 is then forced to the left to return the piston to its initial position. The actuating finger 98 on the head 97 is arranged to engage the actuator 95a of the switch 95 at about the same time that the actuator finger 136 engages the actuator 134 of the switch 133. The reversing switch 95 is therefore closed at about the same time that the control switch 133 is opened. Closing of the reversing switch 95 energizes the solenoid 89 to operate the valve 76 and apply pressure to the left piston face 71a of the flow reversing valve, to thereby return the reversing valve to the position shown in FIG. 2. Opening of the normally closed control switch 133 interrupts the holding circuit to the relay coil 131 and de-energizes the drive motor 16. The inertia of the motor and the interconnecting drive causes some rotation of the main pump 10 and the metering pump 35 after the relay 131 is opened. Since the reversing valve has been returned to the position shown in FIG. 2, the additional fluid dispensed by the metering pump extends the piston 56 slightly and allows the control switch 133 to reclose and the reversing switch 95 to reopen. Thus, closing of the start switch 143 energizes the rotary apparatus and the latter is rotated through a number of revolutions until the quantity of fluid dispensed by the metering pump is sufficient to extend the piston and retract it to its initial position. Since the metering pump is driven in proportion to the main pump, the metering pump and measuring cylinder effectively counts the number of revolutions of the main pump. When the measuring piston is returned to its normal position, it operates the control switch 133 and de-energizes the main pump drive motor 16.

While the control system having the hydraulically operated measuring apparatus of the present invention is advantageously employed, and is herein shown and described in conjunction a rotary dispensing pump to operate the dispensing pump for a preset number of revolutions and then automatically interrupt operation of the latter, it is obvious that the control system can also be employed with other rotary devices and to perform other functions.

I claim:

1. A rotary device having a drive shaft for driving the device and cyclically operable means associated with said device, drive means for rotating the shaft, means for measuring the number of revolutions of the drive shaft including, a positive displacement type hydraulic metering pump having an inlet and an outlet conduit means connecting the metering pump inlet with a reservoir means, means operatively connecting the metering pump to the drive shaft to drive the metering pump whereby the metering pump delivers fluid in proportion to the number of revolutions of the drive shaft, a measuring cylinder having a movable wall therein, said movable wall being reciprocable between first and second positions, means including a flow reversing valve connecting the metering pump outlet with the cylinder for supplying, hydraulic fluid selectively at one or the other side of the movable wall therein whereby the wall is displaced a distance proportionate to the revolutions of the drive shaft, a first means operable when the movable wall is in said first position for moving the flow reversing valve to a first position to pass fluid to one side of the movable wall, a second means operable when the movable wall is in a second position for moving the flow reversing valve to a second position to pass fluid to the other side of the movable wall, control means responsive to a preselected travel of the wall for operating said cyclically operable means, and means connecting the cylinder to the reservoir means to return fluid thereto.

2. A rotary device having a drive shaft for driving the device and cyclically operable means associated with said device, drive means for rotating the shaft, means for measuring the number of revolutions of the drive shaft including, a positive displacement type hydraulic metering pump having an inlet and an outlet conduit means connecting the metering pump inlet with a reservoir means, means operatively connecting the metering pump to the drive shaft to drive the metering pump whereby the metering pump delivers fluid in proportion to the number of revolutions of the drive shaft, a measuring cylinder having a movable wall therein, said movable wall being reciprocable between first and second positions, means including a flow reversing valve connecting the metering pump outlet with the cylinder for supplying hydraulic fluid selectively at one or the other side of the movable wall therein whereby the wall is displaced a distance proportionate to the revolutions of the drive shaft, a first means operable when the movable wall is in said first position for moving the flow reversing valve to a first position to pass fluid to one side of the movable wall, a second means operable when the movable wall is in a second position for moving the flow reversing valve to a second position to pass fluid to the other side of the movable wall, control means operated when the wall, reaches one of said positions for operating said cyclically operable means, and means connecting the cylinder to the reservoir means to return fluid thereto.

3. The device of claim 2 including means for adjusting the distance between said first and second means to thereby adjust the number of revolutions of the drive shaft required to operate said control means.

4. The device of claim 2 wherein said cylically operable means is operative to interrupt said drive means to stop the device.

5. An apparatus having a drive shaft operable to drive the apparatus through a cycle when the drive shaft is rotated through a number of revolutions, drive means operable to rotate the drive shaft, means for measuring the number of revolutions of the drive shaft including, a positive displacement type hydraulic metering pump having an inlet and an outlet, means operatively connecting the metering pump to said drive shaft to drive the metering pump whereby the metering pump delivers fluid in proportion to the number of revolutions of the drive shaft, a measuring cylinder having a movable wall therein and a rod connected to said movable wall, conduit means connecting the metering pump to a reservoir means, means connecting the metering pump outlet to the cylinder for supplying hydraulic fluid to the cylinder whereby the wall and rod are displaced a distance proportionate to the revolutions of the drive shaft, and control means including a first means for operating the drive means to initiate an operating cycle of said apparatus, said control means including a second means operated by the rod when it has traveled through a preselected distance for interrupting said drive means to stop the operating cycle.

6. An apparatus having a drive shaft operable to drive the apparatus through a cycle when the drive shaft is rotated through a number of revolutions, drive means operable to rotate the drive shaft, means for measuring the number of revolutions of the drive shaft including, a positive displacement type hydraulic metering pump having an inlet and an outlet, means operatively connecting the metering pump to said drive shaft to drive the metering pump whereby the metering pump delivers fluid in proportion to the number of revolutions of the drive shaft, a measuring cylinder having a movable wall therein and a rod connected to said movable wall, conduit means connecting the metering pump to a reservoir means, means connecting the metering pump outlet to the cylinder for supplying hydraulic fluid to the cylinder whereby the wall and rod are displaced a distance proportionate to the revolutions of the drive shaft, and control means including a first means for operating the drive means to initiate an operating cycle of said apparatus, said control means including a second means operated by the rod when it has traveled through a preselected distance for interrupting said drive means to stop the operating cycle, said control means including means for adjusting said preselected distance through which the rod moves to operate said second means to thereby enable adjustment of the number of revolutions through which the drive shaft will rotate before interruption and thus selectively adjust the duration of the operating cycle.

7. An apparatus having a drive shaft operable to drive the apparatus through a cycle when the drive shaft is rotated through a number of revolutions, drive means operable to rotate the drive shaft, means for measuring the number of revolutions of the drive shaft including, a positive displacement type hydraulic metering pump having an inlet and an outlet, means operatively connecting the metering pump to said drive shaft to drive the metering pump whereby the metering pump delivers fluid in proportion to the number of revolutions of the drive shaft, a measuring cylinder having a movable wall therein and a rod connected to said movable wall, conduit means connecting the metering pump to a reservoir means, means including a reversing valve connecting the metering pump outlet with the cylinder for supplying hydraulic fluid selectively at one or the other side of the movable wall therein whereby the wall and rod are displaced a distance proportionate to the revolutions of the drive shaft, and control means including a first means for operating said pump drive means to initiate an operating cycle of said apparatus, said control means including a second means operated by the rod after it has travelled through a preselected distance for interrupting said drive means to stop the operating cycle, said control means including a third means responsive to the position of said rod for operating said reversing valve.

8. An apparatus having a drive shaft operable to drive the apparatus through a cycle when the drive shaft is rotated through a number of revolutions, drive means operable to rotate the drive shaft, means for measuring the number of revolutions of the drive shaft including, a positive displacement type hydraulic metering pump having an inlet and an outlet, means operatively connecting the metering pump to said drive shaft to drive the metering pump whereby the metering pump delivers fluid in proportion to the number of revolutions of the drive shaft, a measuring cylinder having a movable wall therein conduit means connecting the metering pump to a reservoir means, means including a reversing valve connecting the metering pump outlet with the cylinder for supplying hydraulic fluid selectively at one or the other side of the movable wall therein whereby the wall is displaced a distance proportionate to the number of revolutions of the drive shaft, and control means including a first means for operating said pump drive means to initiate an operating cycle of said apparatus, said control means including a second means operated by the wall after it has travelled through a preselected distance proportionate to a number of revolutions of the driveshaft for interrupting said drive means to stop the operating cycle, said control means including a third means responsive to the position of said wall for operating said reversing valve, said control means including means for adjusting said preselected distance through which the wall moves to operate said second means to thereby enable adjustment of the number of revolutions through which the drive shaft will rotate before interruption and thus selectively adjust the duration of the operating cycle.

9. An apparatus for pumping a preselected selectively adjustable quantity of material comprising, a product pump having a drive shaft for pumping a quantity of material from a source of supply proportioned to the number of revolutions of the drive shaft, drive means operable to drive the pump drive shaft, means for measuring the number of revolutions of the pump drive shaft including, a positive displacement type hydraulic metering pump having an inlet and outlet, means operatively connecting the metering pump to said drive shaft to drive the metering pump proportionately to the product pump, a measuring cylinder having a movable wall therein and a rod connected to said movable wall, conduit means connecting the metering pump inlet to a reservoir means and connecting the outlet with the cylinder for supplying hydraulic fluid to the cylinder whereby the wall and rod are displaced a distance proportionate to the revolutions of the drive shaft, and control means including a first means for operating the pump inlet to a reservoir means and connecting the drive means to initiate a pumping cycle, said control means including a second means operated by the rod after it has travelled through a preselected distance for interrupting said pump drive means to stop the pumping cycle, said second means including means for adjusting said preselected distance through which said rod moves to operate said second means to thereby enable adjustment of the number of revolutions through which the drive shaft will rotate before interruption and thus selectively adjust the quantity of material pumped by the main pump.

10. An apparatus for pumping a preselected selectively adjustable quantity of material comprising, a product pump having a drive shaft for pumping a quantity of material from a source of supply proportional to the number of revolutions of the drive shaft, drive means operable to drive the pump drive shaft, means for measuring the number of revolutions of the pump drive shaft including, a positive displacement type hydraulic metering pump having an inlet and an outlet, means operatively connecting the metering pump to said drive shaft to drive the metering pump proportionately to the product pump, a measuring cylinder having a movable wall therein and a rod connected to the movable wall and extending out of the measuring cylinder, conduit means connecting the metering pump to a reservoir means, means including a reversing valve connecting the metering pump outlet with the cylinder for supplying hydraulic fluid selectively at one or the other side of the movable wall therein whereby the wall and rod are displaced a distance proportionate to the revolutions of the drive shaft, and control means including a first means for operating the pump drive means to initiate a pumping cycle, said control means including a second means operated by the rod after it has travelled through a preselected distance proportionate to a number of revolutions of the pump drive shaft for interrupting said pump drive means to stop the pumping cycle thereby limiting the quantity of material pumped by the product pump, said control means including a third means responsive to the position of said rod for operating said reversing valve.

11. An apparatus for pumping a preselected selectively adjustable quantity of material comprising, a product pump having a drive shaft for pumping a quantity of material from a source of supply proportional to the number of revolutions of the drive shaft, drive means operable to drive the pump drive shaft, means for measuring the number of revolutions of the pump drive shaft including, a positive displacement type hydraulic metering pump having an inlet and an outlet, means operatively connecting the metering pump to said drive shaft to drive the metering pump proportionately to the product pump, a measuring cylinder having a movable wall therein conduit means connecting the metering pump to a reservoir means, means including a reversing valve connecting the metering pump outlet with the cylinder for supplying hydraulic fluid selectively at one or the other side of the movable wall therein whereby the wall is displaced a distance proportionate to the number of revolutions of the drive shaft, and control means including a first means for operating the pump drive means to initiate a pumping cycle, said control means including a second means operated by the wall after it has travelled through a preselected distance proportionate to a number of revolutions of the pump drive shaft for interrupting said pump drive means to stop the pumping cycle thereby limiting the quantity of material pumped by the product pump, said control means including a third means responsive to the position of said wall for operating said reversing valve, said control means including means for adjusting said preselected distance through which the wall moves to operate said second means to thereby enable adjustment of the number of revolutions through which the drive shaft will rotate before interruption and thus selectively adjust the duration of the operating cycle.

12. The apparatus of claim 11 wherein said drive means includes a motor and an adjustable speed transmission connecting said motor to said drive shaft.

13. An apparatus for pumping a preselected selectively adjustable quantity of material comprising, a product pump having a drive shaft for pumping a quantity of material from a source of supply proportional to the number of revolutions of the drive shaft, drive means operable to drive the pump drive shaft, means for measuring the number of revolutions of the pump drive shaft including, a positive displacement type hydraulic metering pump having an inlet and an outlet, means operatively connecting the metering pump to said drive shaft to drive the metering pump proportionately to the product pump, a measuring cylinder having a movable wall therein, conduit means connecting the metering pump to a reservoir means, means including a reversing valve connecting the metering pump outlet with the cylinder for supplying hydraulic fluid selectively at one or the other side of the movable wall therein whereby the wall is displaced a distance proportionate to the number of revolutions of the drive shaft, and control means including a first means for operating the pump drive means to initiate a pumping cycle, said control means including a second means operated by the wall after it has travelled through a preselected distance proportionate to a number of revolutions of the pump drive shaft for interrupting said pump drive means to stop the pumping cycle thereby limiting the quantity of material pumped by the product pump, said control means including a third means operative when the wall is in one position for moving the flow reversing valve to a first position and a fourth means operative when the wall is in a second position for moving the flow reversing valve to its other position to reverse the direction of movement of the movable wall in the measuring cylinder.

14. A rotary device having drive shaft, drive means operable to rotate said rotary device, means for measuring the number of revolutions of the drive shaft including, a positive displacement type hydraulic metering pump having an inlet and an outlet, means operatively connecting the metering pump to the drive shaft to rotate the metering pump in proportion to the number of revolutions of the drive shaft, a measuring cylinder having a movable wall therein, conduit means connecting the metering pump to a reservoir means, means including a flow reversing valve connecting the metering pump outlet with the cylinder for supplying hydraulic fluid selectively at one or the other side of the movable wall therein whereby the wall is displaced a distance proportionate to the revolutions of the drive shaft, said movable wall being reciprocable between first and second positions, a first means operable when the movable wall is in said first position for moving said flow reversing valve to a first position to pass fluid to one side of the movable wall, a second means operable when the movable wall is in said second position for moving said flow reversing valve to a second position to pass fluid to the other side of the movable wall, selectively operable means for operating said drive means to rotate said device, and control means operated by said wall when it reaches one of said positions for interrupting said drive means to stop the rotary device.

15. In a rotary device having drive shaft, drive means operable to rotate said rotary device, means for measuring the number of revolutions of the drive shaft including, a positive displacement type hydraulic metering pump having an inlet and an outlet, means operatively connecting the metering pump to the drive shaft to rotate the metering pump in proportion to the number of revolutions of the drive shaft, a measuring cylinder having a movable wall therein, conduit means connecting the metering pump to a reservoir means, means including a flow reversing valve connecting the metering pump outlet with the cylinder for supplying hydraulic fluid selectively at one or the other side of the movable wall therein whereby the wall is displaced a distance proportionate to the revolutions of the drive shaft, said movable wall being reciprocable between first and second positions, a first means operable when the movable wall is in said first position for moving said flow reversing valve to a first position to pass fluid to one side of the movable wall, a second means operable when the movable wall is in said second position for moving said flow reversing valve to a second position to pass fluid to the other side of the movable wall, selectively operable means for operating said drive means to rotate said device, said movable wall moving from said first position to said second position and back to said first position when said selectively operable means is actuated, and control means operated by said wall when the wall reaches said first position for interrupting said drive means to stop the rotary device.

References Cited by the Examiner

UNITED STATES PATENTS

| | | | |
|---|---|---|---|
| 2,620,960 | 12/52 | Harrington | 222—250 X |
| 2,649,996 | 8/53 | Harrington | 222—250 X |
| 2,755,966 | 7/56 | Lindars | 222—250 X |
| 3,028,050 | 4/62 | Nelson | 222—16 |

SAMUEL F. COLEMAN, *Primary Examiner.*

LOUIS J. DEMBO, *Examiner.*

UNITED STATES PATENT OFFICE
CERTIFICATE OF CORRECTION

Patent No. 3,207,367                                        September 21, 1965

Ralph F. Anderson

It is hereby certified that error appears in the above numbered patent requiring correction and that the said Letters Patent should read as corrected below.

Column 6, line 11, for "supplying," read -- supplying --; line 49, for "the wall," read -- the wall --; column 7, line 72, after "therein" insert a comma; column 8, lines 37 and 38, strike out "inlet to a reservoir means and connecting the"; line 47, for "main" read -- product --; column 9, line 15, after "therein" insert a comma.

Signed and sealed this 3rd day of May 1966.

(SEAL)
Attest:

ERNEST W. SWIDER                                        EDWARD J. BRENNER
Attesting Officer                                             Commissioner of Patents